Dec. 7, 1971 L. MONTEIRO 3,624,892
APPARATUS FOR STRIPPING FLEXIBLE TUBES FROM MANDRELS
Filed Aug. 1, 1969 2 Sheets-Sheet 1

INVENTOR
LEVI MONTEIRO

BY Clifford B. Price
ATTORNEY

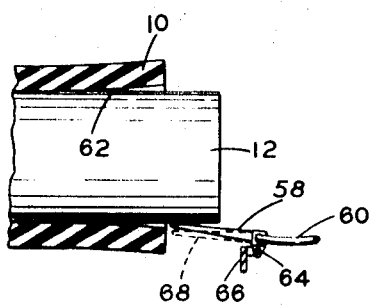
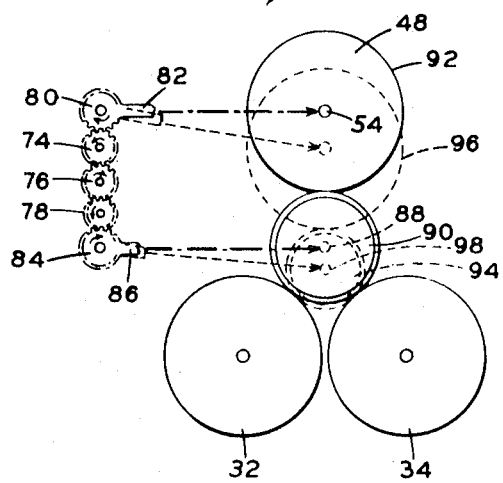

3,624,892
APPARATUS FOR STRIPPING FLEXIBLE TUBES FROM MANDRELS

Levi Monteiro, Plymouth, Mass., assignor to
Armstrong Cork Company, Lancaster, Pa.
Filed Aug. 1, 1969, Ser. No. 846,888
Int. Cl. B23p 19/02, 17/04
U.S. Cl. 29—235                                8 Claims

ABSTRACT OF THE DISCLOSURE

An apparatus for stripping flexible tubes from mandrels on which they are cured. The bond at the interface between the tube and the mandrel is broken by injecting a liquid at high pressure into the interface while simultaneously massaging the outer surface of the tube. Once the bond is broken, it is possible to axially displace the mandrel with a pneumatic ram.

BACKGROUND OF THE INVENTION

Field of the invention

This invention relates to an apparatus for removing tubes from their cores. More particularly, this invention is concerned with stripping flexible tubes from the mandrels on which they are positioned by using a fluid to break the bond at the interface between the tube and the mandrel.

Description of the prior art

U.S. Pat. No. 2,604,658, Broden, discloses an apparatus for mounting and demounting mandrel-held flexible tubes. In the demounting portion of this apparatus, the head of a pneumatically actuated piston engages one end of the mandrel and forces it into a bore. At the same time, one end of the tube is forced into a coaxial and larger bore where compressed air is forced against said tube end to separate it from the mandrel. The pneumatically actuated piston continues to push the mandrel through the first bore and out of the tube.

As taught in the prior art, a fluid such as air can break the bond at the interface between a flexible tube positioned on a mandrel and the mandrel if both the tube and mandrel precisely fit their respective bores. Otherwise, the air would take the path of least resistance and escape from the bore without breaking the bond at the interface. If the interface bond is not broken by the air, then the pneumatic actuated piston must exert enough force to both break the interface bond and remove the mandrel from the tube. If this force is not great enough to overcome these two resistive forces, the tube will not be removed from the mandrel. One hundred percent removal is therefore not effected. If the force is great enough to overcome the two resistive forces, there is a likelihood of damaging either or both the tube and mandrel. This is economically undesirable.

However, even if the interface bond is broken with air, the tube is still difficult to remove from the mandrel because of the frictional drag of the tube against the mandrel surface. This then requires that a substantial force be exerted to remove the mandrel. The possibility of damage to the tube and/or mandrel is thereby increased.

The problems of the prior art are solved by the invention herein since a liquid fluid, water, is used in conjunction with a set of massaging rolls to break the bond of the interface, that is, the total circumferential area of the mandrel and contacting tube. The massaging action on the tube not only helps to break the interface bond, but it also helps to distribute the water along the entire length of the interface. This water at the interface between the tube and the mandrel acts as a lubricant and therefore greatly facilitates the stripping of the tube from the mandrel. Furthermore, by using the nozzle arrangement of this invention, which arrangement automatically adjusts to varying size mandrels, there is no problem of the water not being injected into the interface between the tube and mandrel to effect a breaking of this interface bond.

SUMMARY OF THE INVENTION

This invention is directed to an apparatus for stripping flexible tubes from the mandrels on which they have been cured. The separated tubes and mandrels are then removed from the stripping apparatus.

A conveyor transfers the tube positioned on a mandrel to the stripping apparatus. As the tube positioned on a mandrel enters the stripping apparatus, it triggers a switch to start the apparatus. The tube positioned on a mandrel enters the apparatus and is positioned between three rolls. Pressure is exerted on the tube by the three rolls. As these rolls rotate, and hence, massage the tube, a stream of water under high pressure is injected into the interface between the outer surface of the mandrel and the inner surface of the tube to break the bond therebetween.

After this interface bond is broken, a pneumatic ram engages the end of the mandrel and forces it out of the tube. The pneumatic ram is then withdrawn to its original position. The separated tubes and mandrels are then removed from the apparatus.

The main improvement in this stripping apparatus is the combination of the high pressure stream of water injected into the interface between the tube and the mandrel and the massaging action of the rolls to break the interface bond between the tube and mandrel. The massaging action of the rolls also helps to distribute the water along the entire length and circumference of the tube-mandrel interface. After the bond is broken, the water acts as a lubricant in the interface between the tube and the mandrel to facilitate the stripping action of the tube from the mandrel by the pneumatic ram. Without this combination of elements, the stripping of the flexible tubes from the mandrels could not be effectively accomplished.

The primary object of this invention is to present an apparatus for stripping a flexible tube positioned on a mandrel from the mandrel which apparatus is 100% effective.

A further object of this invention is to present an apparatus for stripping a flexible tube positioned on a mandrel from a mandrel which apparatus causes no damage to the tube and/or mandrel during the stripping operation.

BRIEF DESCRIPTION OF THE DRAWINGS

FIG. 3 is a cross-sectional view along line III—III of FIG. 2 showing the nozzle arrangement in relation to the tube positioned on the mandrel and the mandrel.

FIG. 4 is an enlarged view of the ram-centering mechanism.

DESCRIPTION OF THE PREFERRED EMBODIMENT

Figure 1:
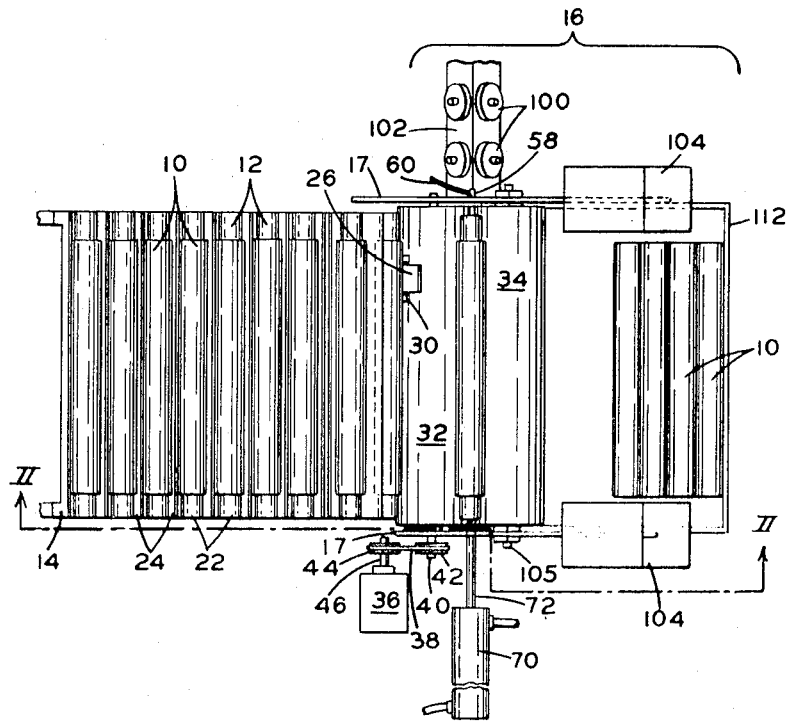
FIG. 1 is a top view of an apparatus for stripping flexible tubes from mandrels with the top roll which is positioned above the drive and eject rolls removed.
Figure 2:
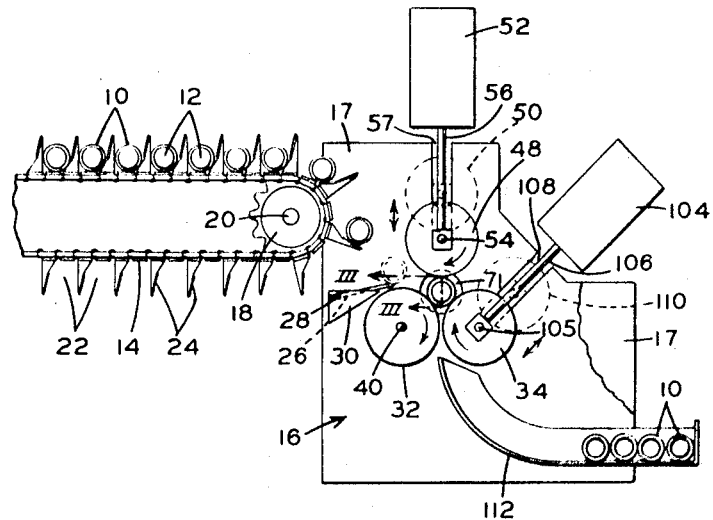
FIG. 2 is a cross-sectional view along line II—II of FIG. 1 with the top roll shown and with a portion of the side frame of the stripping apparatus removed.

A flexible tube 10 such as a rubber composition textile drafting apron described in U.S. Pat. No. 2,539,372 is positioned and cured on a mandrel 12. The tube 10 that is positioned on the mandrel 12 is transferred from a loading station on a conveyor 14 to the apparatus 16 for stripping the tube 10 from the mandrel 12. The conveyor 14 is endless and is driven about conventional drive members, such as sprockets 18 mounted on shaft 20. Conveyor 14 is divided into individual stations 22 by upright members 24 which traverse the entire width of conveyor 14. Each individual station 22 on conveyor 14 carries one tube positioned on a mandrel. The upright members 24 are longitudinally spaced on the conveyor 14 so that the individual stations 22 are capable of carrying tubes 10 mounted on mandrels 12 of varying diameters.

The conveyor 14 can be driven by any conventional electric or pneumatic driving mechanism which can supply an intermittent driving force. As the conventional electric or pneumatic drive of conveyor 14 is activated, conveyor 14 advances by one individual station 22. When the conveyor 14 is operating with a tube positioned on a mandrel in each individual station 22, the intermittent operation of the conveyor 14 delivers a tube 10 positioned on a mandrel 12 to the apparatus 16 each time the conveyor is advanced.

As the conveyor 14 is intermittently advanced one individual station 22, a tube 10 positioned on a mandrel 12 rolls off upright member 24 into apparatus 16. As the tube positioned on the mandrel passes from the end of the upright member 24 into apparatus 16, the tube positioned on the mandrel rolls over and thereby triggers a cycle actuating switch 26. The cycle actuating switch 26 is a conventional electric or pneumatic switch pivoting about shaft 28 mounted in bracket 30. Switch 26 triggers the appripriate conventional electric or pneumatic circuitry to activate the cycle for stripping the tube 10 from the mandrel 12.

After depressing the cycle actuating switch 26 and thereby starting the cycle for stripping the tube 10 from the mandrel 12, the tube and the mandrel roll over drive roll 32 and come to rest in the valley formed by the juxtapositioned drive roll 32 and eject roll 34. Drive roll 32 is driven by an actuator 36 through belt 38. Belt 38 connects shaft 40 of drive roll 32 through the pulley 42 mounted thereon to shaft 46 of actuator 36 through pulley 44 mounted thereon.

The first step of the stripping cycle initiated by the cycle actuating switch 26 is the downward movement of top roll 48 into contact with the outer surface of tube 10 positioned on mandrel 12 which has come to rest in the valley formed by the juxtapositioned drive roll 32 and eject roll 34. When the tube positioned on the mandrel enters between the drive roll 32, eject roll 34 and top roll 48, top roll 48 is in its uppermost position as shown by broken line 50. Having top roll 48 in its uppermost position facilitates the entry of the tube positioned on the mandrel, and especially tubes positioned on mandrels having varying diameters, between drive roll 32, eject roll 34 and top roll 48.

Top roll 48 is moved between its uppermost and lowermost positions by two pneumatic cylinders 52 one being positioned at each side of apparatus 16. Pneumatic cylinders 52 are connected to the shaft 54 of top roll 48 by piston rods 56. Shaft 54 reciprocates in slots 57, one being located at each side of frame 17 of apparatus 16.

Top roll 48 moves from its uppermost position 50 downward into contact with the outer surface of the tube 10 positioned on mandrel 12. The extent of this downward travel of top roll 48 is determined by the outside diameter of the tube positioned on the mandrel. A slight pressure is exerted on the tube positioned on the mandrel due to the internal pressure of the pneumatic drive for roll 48. Since the downward travel of top roll 48 is regulated by the diameter of the tube 10 positioned on mandrel 12, and not by a preset linear distance of travel, the apparatus 16 described herein can accommodate tubes 10 positioned on mandrels 12 having overall diameters in the range of about 1 in. to 4 ins. The top roll 48 would automatically adjust to varying overall diameters within this range.

When top roll 48 stops its movement, a conventional electrical or pneumatic circuit then simultaneously activates drive roll 32 and conventional valving to supply water to nozzle 58 through water inlet 60. Since the rolls 32, 34 and 48 do not contact each other, rotary motion is transmitted to eject roll 34 and top roll 48 through the rotary motion of tube 10 positioned on mandrel 12. This rotary action of drive roll 32, eject roll 34 and top roll 48 on the outer surface of tube 10 massages tube 10 positioned on mandrel 12. This massaging action of the three rolls on the tube 10 positioned on mandrel 12 interacts with the water from nozzle 58 injected into the interface 62 between the tube 10 and mandrel 12 to break the interface bond between said tube and mandrel.

As water under pressure in the range of about 1000 to 3000 p.s.i. passes through nozzle 58 which is pivoted about shaft 64 rotatably mounted in bracket 66, the reaction to the water produces a torque about shaft 64 which tends to make nozzle 58 rotate in a clockwise direction. However, since the mandrel is always axially positioned between drive roll 32, eject roll 34 and top roll 48 so that the end of mandrel 12 overlays nozzle 58, nozzle 58 is limited in its movement by the mandrel. This then allows the nozzle 58 to automatically rotate into contact with the underside of mandrel 12 and thus be automatically positioned to inject water at the interface 62 between tube 10 and mandrel 12. Nozzle 58 will automatically adjust to tubes positioned on mandrels of varying overall diameters since the nozzle 58 will always rotate into contact with the underside of mandrel 12 regardless whether the overall diameter is small and the tube and mandrel ride low in the valley of the juxtapositioned drive roll 32 and eject roll 34 or the overall diameter is large and the tube and mandrel ride higher in the valley of the juxtapositioned drive roll and eject roll. There is a small torque exerted on water inlet 60 to produce an opposing moment to that created by the water passing through nozzle 58. When the water pressure is turned off, this opposing torque exerted by water inlet 60 is sufficient to return the nozzle to its original position as shown by broken line 68.

As the tube 10 is being rotated to be massaged, water from nozzle 58 is being injected into interface 62. The interaction of the massaging of the tube and the injection of water at the interface facilitates the breaking of the bond between the tube 10 and the mandrel 12 at this interface. The massaging action also helps to distribute the water from nozzle 58 along the entire length and circumference of interface 62.

After drive roll 32 has rotated several revolutions in a clockwise direction, a simple camming action triggers a conventional electric or pneumatic reversing switch which activates appropriate conventional circuitry to reverse the direction of drive roll 32 so that it now rotates in a counter clockwise direction several revolutions to reset controls. Simultaneously with the reversing of rotational directions of drive roll 32, appropriate conventional valving means relieves the pressure on top roll 48 so that it is merely exerting reduced pressure on the tube so as to facilitate axial displacement of the mandrel from the tube. Also simultaneously with the reversing of direction of drive roll 32, conventional electrical or pneumatic circuitry is activated so that pressure is fed to pneumatic ram cylinder 70 which activates ram 72.

Pneumatic ram cylinder 70 is connected to top roll 48 through gears 74, 76 and 78 and sectors 80 and 84 on links 82 and 86 respectively as shown in FIG. 4. Ram cylinder 70 is connected to the end of link 86 opposite sector 84. The ratio of the gears and sectors is chosen in such a way that as top roll 48 reciprocates vertically the ram 72 of ram cylinder 70 reciprocates a fraction of this vertical distance. Hence, with the correct gearing ratios, the fractional vertical ram movement is such that the ram is automatically centered on the end of mandrel 12 which is to be removed from tube 10.

In FIG. 4, when a large diameter tube and mandrel 90 is positioned between juxtapositioned drive roll 32 and eject roll 34 and top roll 48, top roll 48 is in position 92 and ram 72 is in position 88, the center of the mandrel of the large diameter tube and mandrel 90. When there is a small diameter tube and mandrel such as 94 positioned between the juxtapositioned drive roll 32 and eject roll 34 and top roll 48, top roll 48 is in position 96 and ram 72 is in position 98, the center of the mandrel of the small diameter tube and mandrel 94. Thus, ram 72 is again positioned at the center of the mandrel. Hence, by choosing the correct gearing ratios, the ram 72 is always positioned at the center of the mandrel 12 which is to be pushed through tube 10 regardless of the diameter of the tube and mandrel.

Since the ram is always automatically positioned at the center of the end of mandrel 12, when the pneumatic ram cylinder 70 is activated, ram 72 moves forward through one of two apertures 71 in frame 17 to engage the end of mandrel 12 and push the mandrel through the tube. The interaction of the water being injected at interface 62 from nozzle 58 which is located at the end of the mandrel opposite the end engaged by ram 72 and the rotation of the drive roll, eject roll and top roll in massaging the tube 10 restrains the tube from being displaced in the direction in which the mandrel is being pushed. The water injected into interface 62 also acts as a lubricant and facilitates the stripping of the tube from the mandrel.

The mandrel 12 is pushed through tube 10 and out of apparatus 16 through the second aperture 71 in frame 17 onto rubber transfer wheels 100 of transfer conveyor 102. Apertures 71 in frame 17 are axially aligned and located on opposite sides of apparatus 16. The mandrel 12 is then transferred away from apparatus 16 on wheels 100 of transfer conveyor 102 in a conventional manner.

When ram 72 has reached the end of its travel and completely pushed the mandrel 12 through tube 10 and onto transfer conveyor 102, several steps are simultaneously activated through appropriate conventional electrical or pneumatic triggering means. The pressure in pneumatic ram 70 reverses to withdraw ram 72 back through tube 10. Simultaneously, appropriate valving means are triggered to shut off the water supplied through water inlet 60 to nozzle 58. As previously mentioned, the slight opposing torque exerted on nozzle 58 through water inlet 60 causes water nozzle 58 to return to its original position 68. At the same time, the pressure in cylinder 52 is reversed which causes top roll 48 to return in an upwardly direction to its uppermost position 50. The last of the steps which simultaneously occur after ram 72 has reached the end of its travel is the triggering of two pneumatic cylinders 104 one being positioned at each side of apparatus 16. Cylinders 104 are connected to the shaft 105 of eject roll 34 by piston rods 106. Pneumatic cylinders 104 cause eject roll 34 to move upwardly at an angle to its uppermost position 110. Shaft 105 reciprocates in slots 108 one being located at each side of frame 17 of apparatus 16.

By moving eject roll 34 upwardly and away from drive roll 32, tube 10 which has been stripped from its mandrel 12 can pass downward therebetween as soon as ram 72 has been completely withdrawn and as soon as the opening between drive roll 32 and eject roll 34 is greater than the outside diameter of tube 10. The tube 10 which passes downwardly between drive roll 32 and eject roll 34 is directed by the arcuately shaped portion of trough 112 to the outside of apparatus 16. At this point, the tube 10 could be transferred in any conventional manner to another work station or merely be removed from the apparatus 16 in any conventional manner.

When eject roll 34 has traveled to its uppermost position 110, and hence is completely open, conventional electrical or pneumatic activating means triggers the pneumatic cylinders 104 to return eject roll 34 to its original juxtaposion with drive roll 32. Simultaneously with the return of eject roll 34 to its original position, appropriate electrical or pneumatic circuitry triggers the drive of the conveyor 14 to advance it one individual station. By advancing conveyor 14 one individual station, a tube 10 positioned on a mandrel 12 enters apparatus 16 tripping the cycle actuating switch 26 and starting a complete new cycle.

Either conventional electrical circuitry or conventional pneumatic valving circuitry can be used for the triggering of the various steps of this apparatus for stripping tubes from mandrels. Likewise, the apparatus for stripping tubes from mandrels can be manually operated by having an operator push individual switches to activate the various steps rather than having the various steps automatically activated by conventional circuitry as is described in this preferred embodiment.

What is claimed is:

1. In an apparatus for stripping a flexible tube from a mandrel wherein the tube is positioned on the mandrel, means injecting water into the interface between said tube and said mandrel, means displacing said mandrel with a ram, and means receiving the separated tube and mandrel from said apparatus, the improvement comprises the combination of a means for injecting the water at high pressure into the interface between said tube and said mandrel to break the bond therebetween and lubricate the interface, a means for massaging the outer surface of said tube to assist the liquid in its distribution along the entire length of said interface and thereby aid in breaking the bond at said interface, and a means for displacing said mandrel axially while said injecting means and said massaging means interact to restrain said tube from axial movement in the direction of travel of said displaced mandrel.

2. The improvement of claim 1 wherein said massaging means comprises a drive roll, an eject roll in juxtaposition to said drive roll to receive a tube positioned on a mandrel therebetween, and a top roll positioned above said drive and eject rolls to cooperate with said drive and eject rolls when rotating to massage said tube on said mandrel.

3. The improvement of claim 2 wherein said eject roll is moveable away from said drive roll to allow the tube which has been stripped from said mandrel to be removed from said apparatus by passing between said drive roll and said eject roll.

4. The improvement of claim 3 wherein said top roll is moveable away from said drive and eject rolls to accommodate the entry of a tube positioned on a mandrel between said drive and eject rolls and said top roll.

5. The improvement of claim 4 wherein said displacing means is connected to said top roll through a gearing arrangement to permit axial alignment of said displacing means with varying size mandrels.

6. The improvement of claim 5 wherein said water injecting means comprises a nozzle arrangement positioned at the end of said massaging means opposite said displacing means and automatically adjustable to varying size mandrels.

7. The improvement of claim 6 comprising a conveying means for transferring said tubes positioned on said mandrels to said stripping apparatus and a cycle actuating means triggered by said tubes positioned on said mandrels as said tubes positioned on said mandrels enter said stripping apparatus from said conveying means.

8. The improvement of claim 7 wherein said water has a pressure in the range of 1000 to 3000 p.s.i.

References Cited

UNITED STATES PATENTS

| 2,604,658 | 7/1952 | Broden | 29—235 X |
| 2,895,867 | 7/1959 | Fourmanoit | 29—427 X |
| 2,983,366 | 5/1961 | Perret | 29—234 X |

ANDREW R. JUHASZ, Primary Examiner

L. GILDEN, Assistant Examiner

U.S. Cl. X.R.

29—234